US009142050B2

(12) United States Patent
Jain et al.

(10) Patent No.: US 9,142,050 B2
(45) Date of Patent: *Sep. 22, 2015

(54) EFFECTIVE ARRANGEMENT OF DATA ELEMENTS

(71) Applicant: International Business Machines Corporation, Armonk, NY (US)

(72) Inventors: Kuldeep Jain, Pune (IN); Sohan Lal, Hanumangarth Jn. (IN); Mrunal S. Lohar, Pune (IN); Rajanikant Malviya, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/494,354

(22) Filed: Sep. 23, 2014

(65) Prior Publication Data

US 2015/0042660 A1    Feb. 12, 2015

Related U.S. Application Data

(63) Continuation of application No. 13/911,763, filed on Jun. 6, 2013.

(51) Int. Cl.
*G06T 11/20*        (2006.01)
(52) U.S. Cl.
CPC .................................. *G06T 11/206* (2013.01)
(58) Field of Classification Search
USPC .......................................................... 345/440
See application file for complete search history.

(56) References Cited

U.S. PATENT DOCUMENTS

| 5,581,677 | A | * | 12/1996 | Myers et al. | 345/440 |
| 6,091,424 | A | * | 7/2000 | Madden et al. | 345/619 |
| 6,320,577 | B1 | * | 11/2001 | Alexander | 345/440.1 |
| 6,972,762 | B2 | | 12/2005 | Ben-Tovim et al. | |
| 7,146,374 | B1 | * | 12/2006 | Molesky | 1/1 |
| 7,583,266 | B2 | | 9/2009 | Ben-Tovim et al. | |
| 8,024,651 | B1 | | 9/2011 | Error | |
| 2004/0032417 | A1 | * | 2/2004 | Chen et al. | 345/636 |
| 2004/0252137 | A1 | * | 12/2004 | Gelber | 345/629 |
| 2006/0082594 | A1 | | 4/2006 | Vafiadis et al. | |
| 2008/0307369 | A1 | | 12/2008 | Liu et al. | |
| 2010/0253686 | A1 | | 10/2010 | Alsbury et al. | |
| 2011/0055760 | A1 | | 3/2011 | Drayton et al. | |
| 2011/0063328 | A1 | * | 3/2011 | Herman et al. | 345/681 |
| 2012/0324360 | A1 | | 12/2012 | Young et al. | |
| 2012/0324388 | A1 | | 12/2012 | Rao et al. | |
| 2013/0093787 | A1 | * | 4/2013 | Fulks et al. | 345/629 |

OTHER PUBLICATIONS ip.com, "Smart pie chart to facilitate information visualization", http://ip.com/IPCOM/000197424, IP.com No. IPCOM111197424D, Publication Date: Jul. 9, 2010.
ip.com, "Method for Automatic Labeling of a Pie Chart That Is Created From a Multi-Component Chart", http://ip.com/IPCOM/000065055, IP.com No. IPCOM000065055D, Publication Date: Oct. 1, 1985.
Chandoo.org, "Group Smaller Slices in Pie Charts to Improve Readability", http://chandoo.org/wp/2009/12/02/group-small-slices-in-pie-charts/, Posted on: Dec. 2, 2009.
Ordering and Labeling Slices in a Pie Chart :: SAS/GRAPH(R) 9, 3: Reference, Third Edit . . . , pp. 1-2, "GCHART Procedure", http://support.sas.com/documentation/cdl/en/graphref/65389/HTML/default/n0ejmrdm6o . . . , May 1, 2013.
The GCHART Procedure : PIE, PIE3D, and DONUT Statements, pp. 1-18, "PIE,PIE3D, and DONUT Statements", http://v8doc.sas.com/sashtml.gref/zart-pie.htm, May 1, 2013.

* cited by examiner

*Primary Examiner* — M Good Johnson
(74) *Attorney, Agent, or Firm* — Gates & Cooper LLP

(57) ABSTRACT

A plurality of data elements are analyzed, in one or more computers, to optimize an arrangement of slices in a pie chart, wherein a value for each of the data elements represents an area of a corresponding one of the slices in the pie chart, and the data elements are ordered by their values, so that labels and lines on placed on the pie chart without overlap.

4 Claims, 11 Drawing Sheets

| Sr. | Label | Value | Sr. | Label | Value |
|---|---|---|---|---|---|
| 1 | China | 70501000 | 18 | Turkey | 83188000 |
| 2 | India | 192376496 | 19 | Iran | 179409000 |
| 3 | United States | 80117096 | 20 | Thailand | 86185697 |
| 4 | Indonesia | 162471000 | 21 | France | 143056383 |
| 5 | Brazil | 85644419 | 22 | United Kingdom | 88337000 |
| 6 | Pakistan | 142319000 | 23 | Italy | 127650000 |
| 7 | Nigeria | 86491000 | 24 | South Africa | 80586757 |
| 8 | Russia | 112336538 | 25 | South Korea | 92337852 |
| 9 | Bangladesh | 88580000 | 26 | Myanmar | 82262000 |
| 10 | Japan | 87840000 | 27 | Argentina | 1515448000 |
| 11 | Mexico | 90776531 | 28 | Colombia | 84320987 |
| 12 | Philippines | 81981000 | 29 | Kenya | 1110193422 |
| 13 | Vietnam | 95350000 | 30 | Spain | 95479453 |
| 14 | Ethiopia | 76341000 | 31 | Ukraine | 91831000 |
| 15 | Egypt | 97758000 | 32 | Tanzania | 99724269 |
| 16 | Germany | 90610097 | 33 | Republic of the Congo | 1110193422 |
| 17 | Poland | 237641326 | 34 | Sri Lanka | 1445350000 |

FIG. 6

| Sr. | Label | Value | Group | Sr. | Label | Value | Group |
|---|---|---|---|---|---|---|---|
| 1 | China | 70501000 |  | 18 | Germany | 90610097 |  |
| 2 | India | 192376496 |  | 19 | Poland | 237641326 |  |
| 3 | United States | 80117096 |  | 20 | Turkey | 83188000 |  |
| 4 | Indonesia | 162471000 |  | 21 | Iran | 179409000 |  |
| 5 | Brazil | 85644419 |  | 22 | Thailand | 86185697 |  |
| 6 | Pakistan | 142319000 |  | 23 | France | 143056383 |  |
| 7 | Nigeria | 86491000 |  | 24 | United Kingdom | 88337000 |  |
| 8 | Russia | 112336538 | A1 | 25 | Italy | 127650000 | A2 |
| 9 | Bangladesh | 88580000 |  | 26 | South Africa | 80586757 |  |
| 10 | Japan | 87840000 |  | 27 | South Korea | 92337852 |  |
| 11 | Mexico | 90776531 |  | 28 | Myanmar | 82262000 |  |
| 12 | Philippines | 81981000 |  | 29 | Spain | 95479453 |  |
| 13 | Vietnam | 95350000 |  | 30 | Ukraine | 91831000 |  |
| 14 | Ethiopia | 76341000 |  | 31 | Tanzania | 99724269 |  |
| 15 | Egypt | 97758000 |  | 32 | Colombia | 84320987 |  |
| 16 | Argentina | 1515448000 | B1 | 33 | Republic of the Congo | 1110193422 | B2 |
| 17 | Kenya | 1110193422 |  | 34 | Sri Lanka | 1445350000 |  |

FIG. 7

EFFECTIVE ARRANGEMENT OF DATA ELEMENTS

CROSS-REFERENCE TO RELATED APPLICATIONS

This application is a continuation under 35 U.S.C. §120 of U.S. Patent Application Ser. No. 13/911,763, filed on Jun. 6, 2013, by Kuldeep Jain et al., entitled "EFFECTIVE ARRANGEMENT OF DATA ELEMENTS,", which application is incorporated by reference herein.

BACKGROUND OF THE INVENTION

1. Field of the Invention.

The present invention relates generally to data visualization and in particular to methods for representing data in a pie chart.

2. Description of Related Art.

Data visualization software has become one of the most competitive segments of the software industry. The primary goal of data visualization software is to represent data to a user in a convenient, effective and meaningful way. Typically, pie charts, bar charts, line charts, and area charts are the most widely used graphical representations. It is important to ensure that these graphical representations convey as much information about the underlying data as possible and be aesthetically pleasing.

In the case of pie charts, information in the form of labels is generally shown outside the pie slices when there are many small data elements. Association of a label with a corresponding slice is shown by a connecting line drawn between them. However, there are many challenges when small slices are concentrated at one place Sometimes, the data provided by the smaller elements in a pie chart are equally important or even more important than other elements. For example, there may be 20 elements, where 3 of the elements comprise 80 percent of the total area of the chart, while the remaining 17elements are shown as very small slices. In this case, it is very difficult to show all the labels with connecting lines to their slices at once using a typical layout. Hence, there is a strong need to show such kind of information in pie charts in a satisfactory layout.

SUMMARY OF THE INVENTION

According to one or more embodiments of the present invention a method, apparatus, and article of manufacture is provided for processing a plurality of data elements for display in a pie chart. Specifically, a plurality of data elements are analyzed, in one or more computers, to optimize an arrangement of slices in a pie chart, wherein a value for each of the data elements represents an area of a corresponding one of the slices in the pie chart, and the data elements are ordered by their values, so that labels and lines on placed on the pie chart without overlap.

The steps or functions performed include:
dividing the plurality of data elements, based on a threshold value, into groups A and B, wherein the threshold value is a standard deviation for the data elements or a user-defined threshold value, and the data elements in group A are below the threshold value, and the data elements in group B are at or above the threshold value;
dividing the data elements in group A into sub-groups A1 and A2, in such a way that both of the sub-groups A1 and A2 contain about equal numbers of the data elements and the slices for the data elements in the sub-groups A1 and A2 cover about a same amount of area in the pie chart;
dividing the data elements in group B into sub-groups B1 and B2, in such a way that the slices for the data elements in the sub-groups B1 and B2 cover about a same amount of area in the pie chart;
arranging the data elements in each of the sub-groups A1 and A2 by pairing a remaining smallest data element with a remaining largest data element in the sub-group A1 or A2, until all, except no more than one, of the data elements is so paired;
generating the pie chart with the slices for the data elements of the sub-group Al placed in a vertical half of the pie chart, such that a horizontal center line axis of the pie chart bisects the slices for the data elements of the sub-group A1;
placing the slices for the data elements from the sub-groups B1, A2, B2 clockwise or counter-clockwise about the pie chart adjacent the slices for the data elements from the sub-group A1; and
outputting the pie chart containing the slices for the data elements of sub-groups A1, B1, A2, B2, wherein labels are placed vertically on each side of the pie chart using a lead line and hook line.

BRIEF DESCRIPTION OF THE DRAWINGS

Referring now to the drawings in which like reference numbers represent corresponding parts throughout:

FIG. 6 is a table listing data to be represented by a pie chart;

FIG. 7 is a table listing the data of FIG. 6 as grouped data;

DETAILED DESCRIPTION OF THE INVENTION

Figure 1:
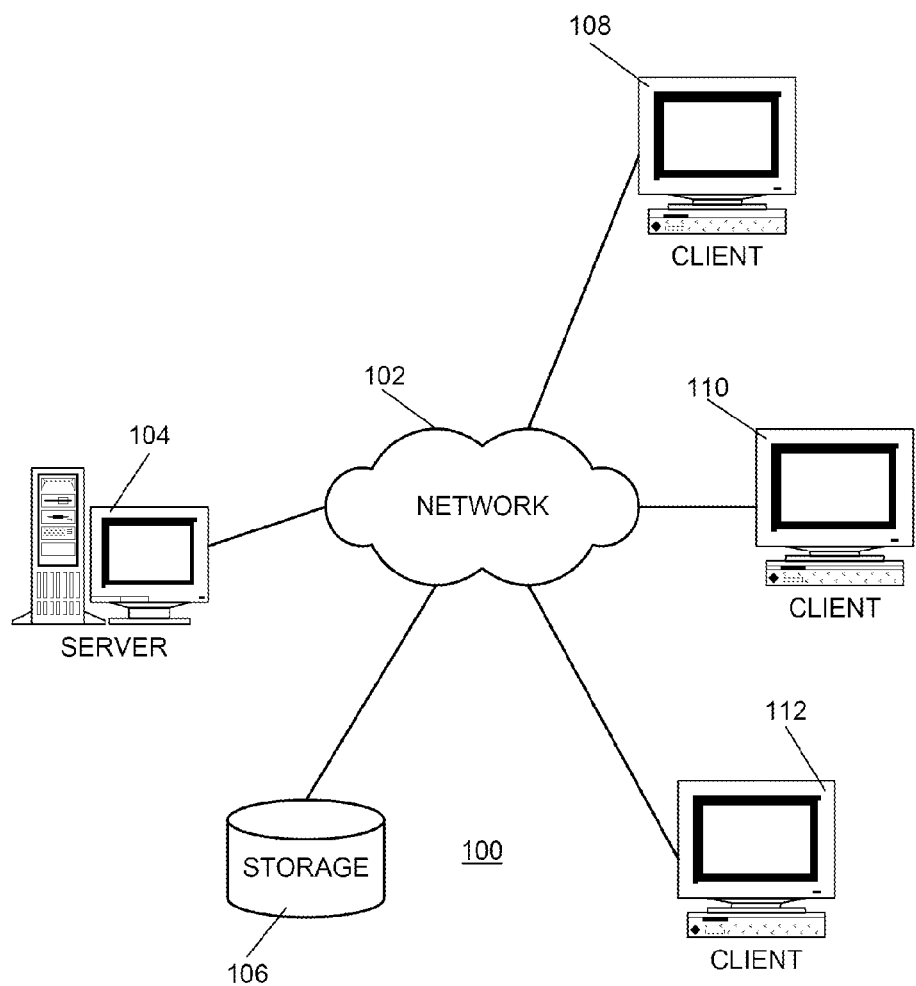
FIG. 1 is a diagram illustrating an exemplary network data processing system that can be used to implement elements of the present invention.

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Overview

Analytics and data representation is one of the most competitive segments in the data age. As data and analytical processing requirements are ever increasing, the world is moving fast towards high data volumes. With the increase of high data volumes, data visualization plays a key role in data representation and context depiction. A new generation of visualizations require the capability to both summarize analysis intent or context and require the capability to express the most minuscule relevant data details at same time.

The present invention provides solutions which uniquely address the main goal of data visualization, i.e., "to communicate information clearly, effectively and accurately," by rearranging the slices in a pie chart. In one aspect of the present invention, a method is provided for arranging the data elements of a pie chart to optimize an arrangement of slices in the pie chart, by ordering the data elements, in order to avoid any potential overlap of labels and connecting lines for the slices in the pie chart.

Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to FIG. 1, a pictorial representation of a network data processing system 100 is presented in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and programs to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
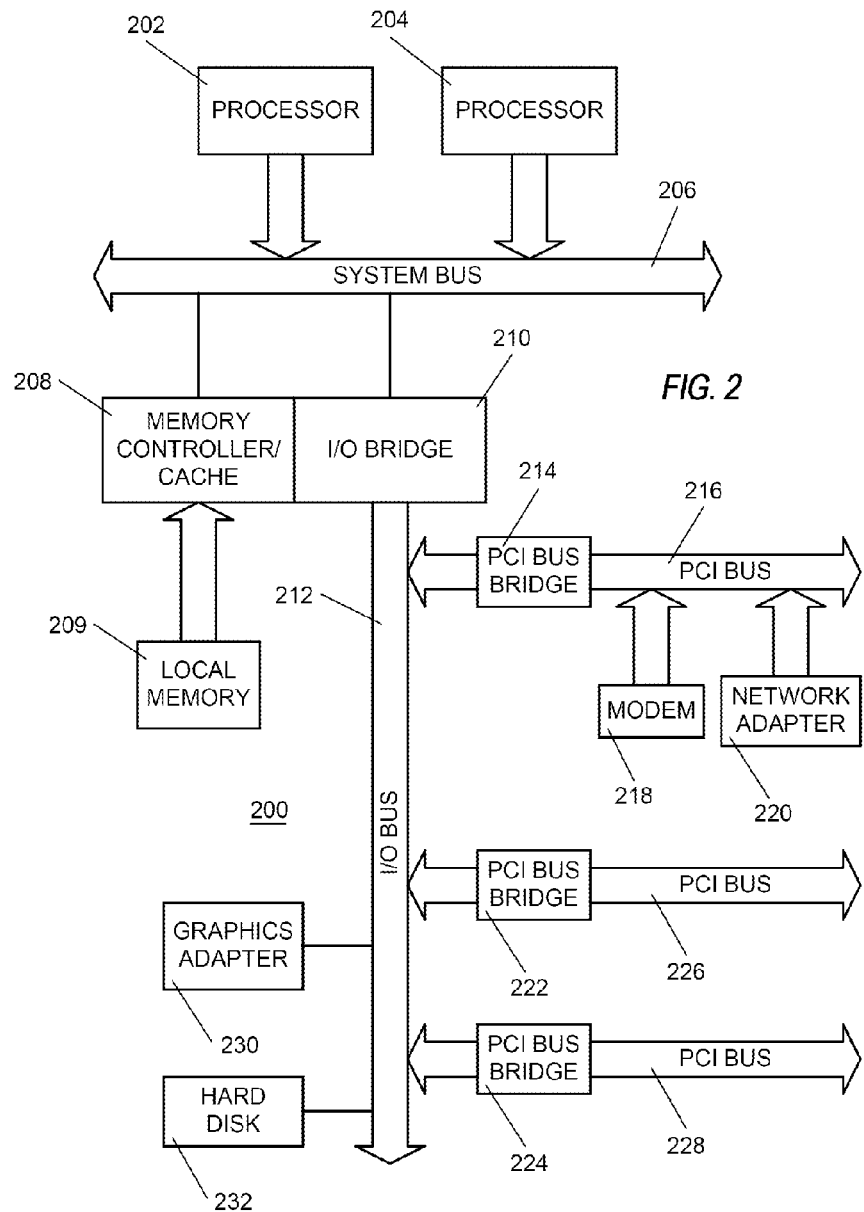
FIG. 2 is a diagram illustrating an exemplary data processing system that can be used to implement elements of the present invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, New York, running the Advanced Interactive Executive (AIX) operating system or LINUX operating system.

Server 104 may provide a suitable website or other internet-based graphical user interface accessible by users to enable user interaction for aspects of an embodiment of the present invention. In one embodiment, Netscape web server, IBM Websphere Internet tools suite, an IBM DB2 for Linux, Unix and Windows (also referred to as "IBM DB2 for LUW") platform and a Sybase database platform are used in conjunction with a Sun Solaris operating system platform. Additionally, components such as JBDC drivers, IBM connection pooling and IBM MQ series connection methods may be used to provide data access to several sources. The term web page as it is used herein is not meant to limit the type of documents and programs that might be used to interact with the user. For example, a typical website might include, in addition to standard HTML documents, various forms, Java applets, JavaScript, active server pages (ASP), Java Server Pages (JSP), common gateway interface scripts (CGI), extensible markup language (XML), dynamic HTML, cascading style sheets (CSS), helper programs, plug-ins, and the like.

Figure 3:
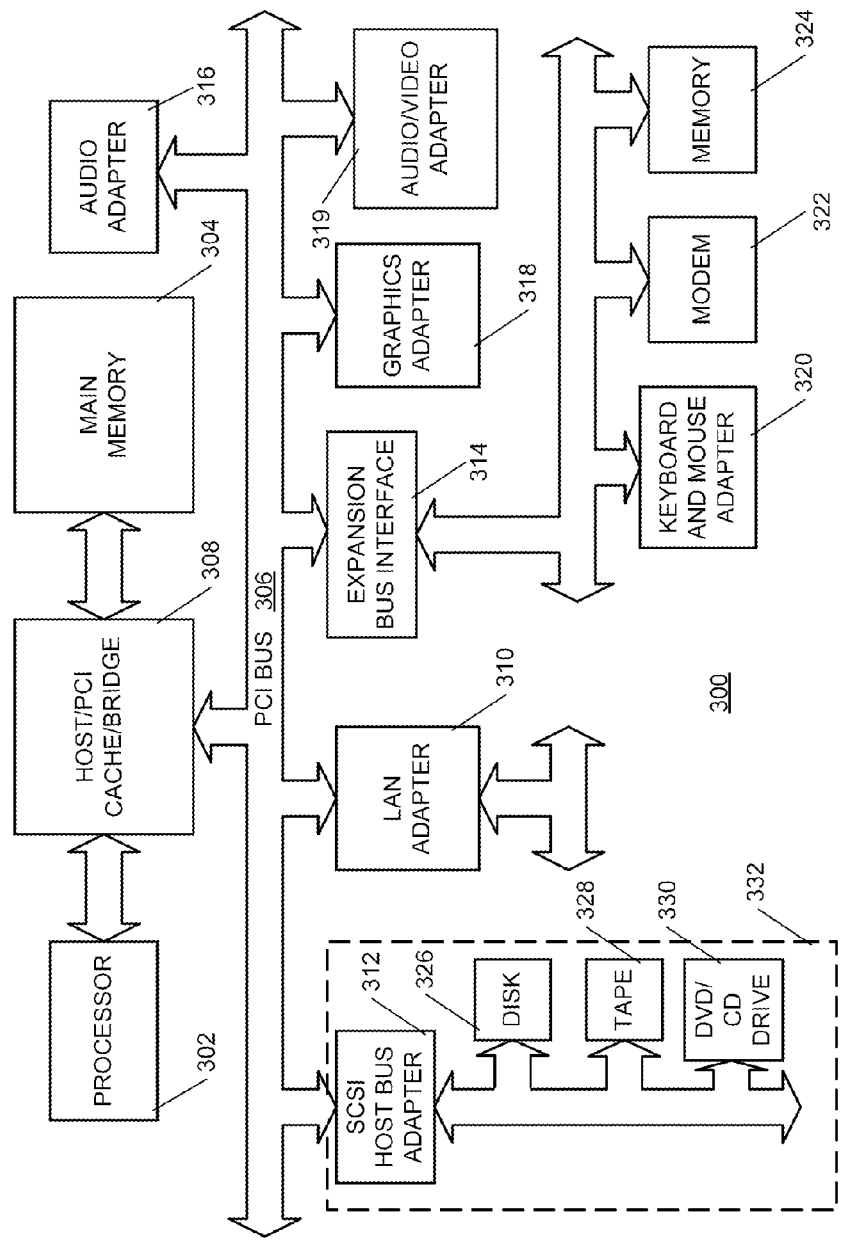
FIG. 3 is a diagram illustrating an exemplary data processing system that can be used to implement elements of the present invention.

With reference now to FIG. 3, a block diagram illustrating a data processing system is depicted in which aspects of an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP®, which is available from Microsoft Corporation. An object oriented programming system such as Java may run in conjunction with the operating system and provide calls to the operating system from Java programs or programs executing on data processing system 300. "Java" is a trademark of Sun Microsystems, Inc. Instructions for the operating system, the object-oriented operating system, and programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance. Further, the present invention may reside on any data storage medium (i.e., floppy disk, compact disk, hard disk, tape, ROM, RAM, etc.) used by a computer system. (The terms "computer," "system," "computer system," and "data processing system" and are used interchangeably herein.)

Those skilled in the art will recognize many modifications may be made to this configuration without departing from the scope of the present invention. Specifically, those skilled in the art will recognize that any combination of the above components, or any number of different components, including computer programs, peripherals, and other devices, may be used to implement the present invention, so long as similar functions are performed thereby.

Pie Chart Visualization

A pie chart visualization is a suitable and powerful user interface (UI) for conveying contributions and representing individual category contributions to a depicted measure. However, with increasing data representation requirements, a pie chart becomes hard to interpret with multiple categories having small contributions to the analyzed fact. A common method used to aid interpretation in such a scenario are "call-out lines and labels," but the advantage of these elements wears off with an increasing number of small contributing categories or when small contributing categories are concentrated at one place.

Figure 4:
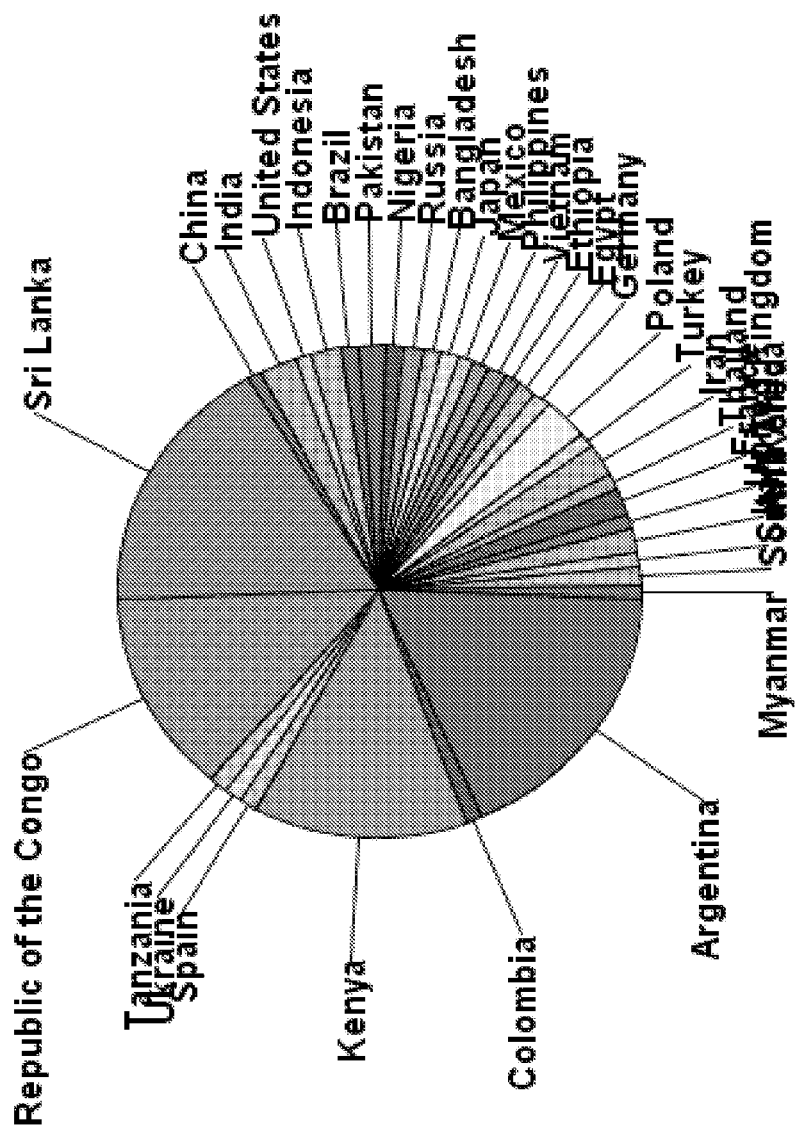
FIG. 4 is a diagram illustrating a pie chart with concentrated thin slices.

As shown for example in FIG. 4, there are various visualization rendering challenges in such scenarios. For example, a connecting line may collide with the adjacent ones or a label may overlap with the adjacent ones. As a result, the pie chart may look unpleasant or be visually unappealing. Although overlapping labels can be avoided by skipping some of the labels, such a solution ultimately leads to an inability to represent all the information at once to the user.

Thus, as a result of the above discussed issues, the main goal of data visualization, i.e., "to communicate information clearly, effectively and accurately," is lost. These challenges are even more prominent in handheld devices, such as mobile phones, tablets and the like, which are already becoming the most prominent platforms for users.

The present invention provides solutions which uniquely address the accuracy issue and other problems discussed above in a more generic way, by rearranging all the slices in a pie chart. In one aspect of the present invention, a method is provided for rearranging the data elements of a pie chart when data for some of the data elements falls below a threshold value (e.g., a standard deviation of the input data) and are concentrated at one place.

One advantage of pie charts is that, unlike bar charts, line charts, area charts, etc., the order of data elements is not important. Small sized slices may be divided equally in two vertical halves of the pie chart. Moreover, in one or more embodiments of the present invention, these thin slices are placed in such a way that they are as close to a horizontal centerline axis as possible, thereby ensuring that labels are shown in the best possible and visually appealing layout. After such an arrangement, labels are placed vertically on each side of pie with lines connecting to corresponding slices. The alignment of labels can be adjusted to avoid the collision with adjacent ones. This approach displays the data in a proper layout on the pie chart.

The present invention provides numerous advantages. All the data elements are shown irrespective of their sizes. Furthermore, all the data elements are shown at once with detailed information (labels) in a limited area. Such a layout also avoids collisions of adjacent labels and intersections of connecting lines with adjacent ones. The available chart area is efficiently utilized by uniformly distributing pie slices on both sides of the pie chart. Thus, a pleasant and visually appealing pie chart is created.

Process Steps

Figure 5:
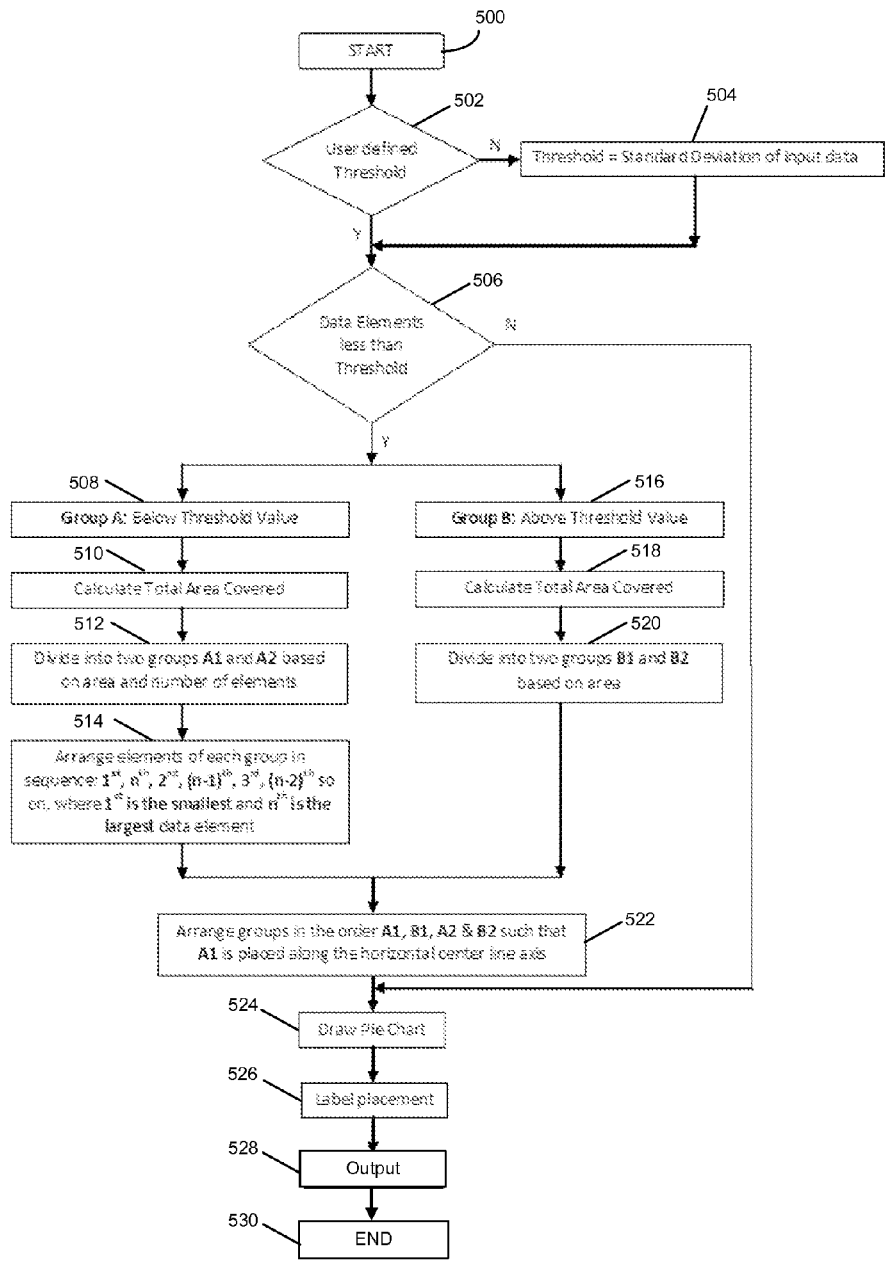
FIG. 5 is a diagram illustrating exemplary process steps that can be used to practice at least one embodiment of the present invention.

FIG. 5 is a flow chart illustrating steps for processing a plurality of data elements for display in a pie chart, in accordance with one or more embodiments of the present invention.

Specifically, the process comprises analyzing, in one or more computers, a plurality of data elements to optimize an arrangement of slices in a pie chart, wherein a value for each of the data elements represents an area of a corresponding one of the slices in the pie chart, and the data elements are ordered by their values, so that labels and lines on placed on the pie chart without overlap. In one embodiment, this process is performed by RAVE (Rapidly Adaptive Visualization Engine), which is a visualization engine implemented on one or more computers.

Block 500 represents the start of the process.

Block 502 is a decision block that determines whether there is a user-defined threshold value. If not, then control transfers to Block 504, which sets the threshold value equal to the standard deviation of the data elements input into the process.

Block 506 is a decision block that determines whether there are data elements less than the threshold value. If not, control transfers to Block 524; otherwise, control transfers to Blocks 508-514 for data elements in group A and Blocks 516-520 for data elements in group B.

Block 508 represents the plurality of data elements being divided, based on the threshold value, into groups A and B, wherein those data elements falling below the threshold value are placed into group A.

Block 510 represents the calculation of the total area covered by the data elements in group A, wherein a value for each of the data elements represents an area of a corresponding one of the slices in the pie chart.

Block 512 represents the data elements in group A being divided into two sub-groups A1 and A2, in such a way that both of the sub-groups A1 and A2 contain about equal numbers of the data elements and the slices for the data elements in the sub-groups A1 and A2 cover about a same amount of area in the pie chart.

Block 514 represents the data elements in each of the sub-groups A1 and A2 being arranged by pairing a remaining smallest data element with a remaining largest data element in the sub-group A1 or A2, until all, except no more than one, of the data elements is so paired. Specifically, the data elements are arranged in a sequence by value comprising: $1^{st}$, $n^{th}$, $2^{nd}$, $(n-1)^{th}$, $3^{rd}$, $(n-2)^{th}$, and so on, wherein $1^{st}$ is the smallest valued data element in the sub-group and $n^{th}$ is the largest valued data element in the sub-group.

Thereafter, control transfers to Block 522.

Block 516 also represents the plurality of data elements being divided, based on the threshold value, into groups A and B, wherein those data elements at or above the threshold value are placed into group B.

Block 518 represents the calculation of the total area covered by the data elements in group B, wherein a value for each of the data elements represents an area of a corresponding one of the slices in the pie chart.

Block 520 represents the data elements in group B being divided into two sub-groups B1 and B2, in such a way that the slices for the data elements in the sub-groups B1 and B2 cover about a same amount of area in the pie chart.

Thereafter, control transfers to Block 522.

Block 522 represents the sub-groups being arranged in the order A1, B1, A2, B2, wherein the pie chart is generated with the slices for the data elements of the sub-group A1 placed in a vertical half of the pie chart, such that a horizontal center line axis of the pie chart bisects the slices for the data elements of the sub-group A1, and the slices for the data elements from the sub-groups B1, A2, B2 are placed clockwise or counter-clockwise about the pie chart adjacent the slices for the data elements from the sub-group A1.

Block 524 represents the pie chart being drawn using the data elements of sub-groups A1, B1, A2, B2.

Block 526 represents labels being placed vertically on each side of the pie chart using lead lines and hook lines.

Block 528 represents the pie chart being output, i.e., the pie chart may be displayed on a monitor coupled to the computer, the pie chart may be printed on a printer coupled to the computer, or the pie chart may be output on some other output device coupled to the computer, or the pie chart may be stored in a file on the computer.

Block 530 represents the end of the process.

Rearrangement of Pie Data Elements

FIGS. 6, 7, 8, 9, 10 and 11 further illustrate the results from the process described in FIG. 5.

Before a pie chart is drawn, the data elements are arranged in a proper way so that label placement can be done evenly on the pie chart without any overlaps or collisions.

FIG. 6 illustrates an illustrative set of data elements that is used to draw a pie chart, wherein each data element is comprised of three columns: series (Sr.), label and value.

As described in FIG. 5, the data elements are divided and collected in two groups: group A having data elements that fall below a threshold value and group B having data elements at or above the threshold value. In one or more embodiments, this threshold value is decided based on the standard deviation of the input data elements. In other embodiments, the threshold value is dynamically defined or adjusted by the user.

The data elements of group A are then divided into two sub-groups A1 and A2, in such a way that both of the sub-groups A1 and A2 contain about an equal number of slices (data elements) and the slices cover about a same amount of area (data element values).

Similarly, the elements of group B are divided into two sub-groups B1 and B2, so that both of the sub-groups B1 and B2 cover about a same amount of area (data element values).

For each sub-group A1 and A2, the data elements are then arranged in the following sequence:

$1^{st}, n^{th}, 2^{nd}, (n-1)^{th}, 3^{rd}, (n-2)^{th}, 4^{th}, (n-3)^{th} \ldots$ where $1^{st}$ is the smallest data element and $n^{th}$ is the largest data element in the sub-group.

So, essentially, for sub-groups A1 and A2, the smallest data element is placed adjacent to the largest data element, the second smallest data element is placed adjacent to the second largest data element, and so on, until data elements are paired (except for possibly one last data element). This ensures that lead and hook lines on the pie chart have sufficient distance between them and do not intersect.

FIG. 7 is a revised version of the set of data elements of FIG. 6, wherein each data element is comprised of three columns: series (Sr.), label, value, and group, showing the grouping of the data elements in sub-groups A1, A2, B1, B2, as well as the arrangement of the sub-groups in the order A1, B1, A2, B2.

Figure 8:
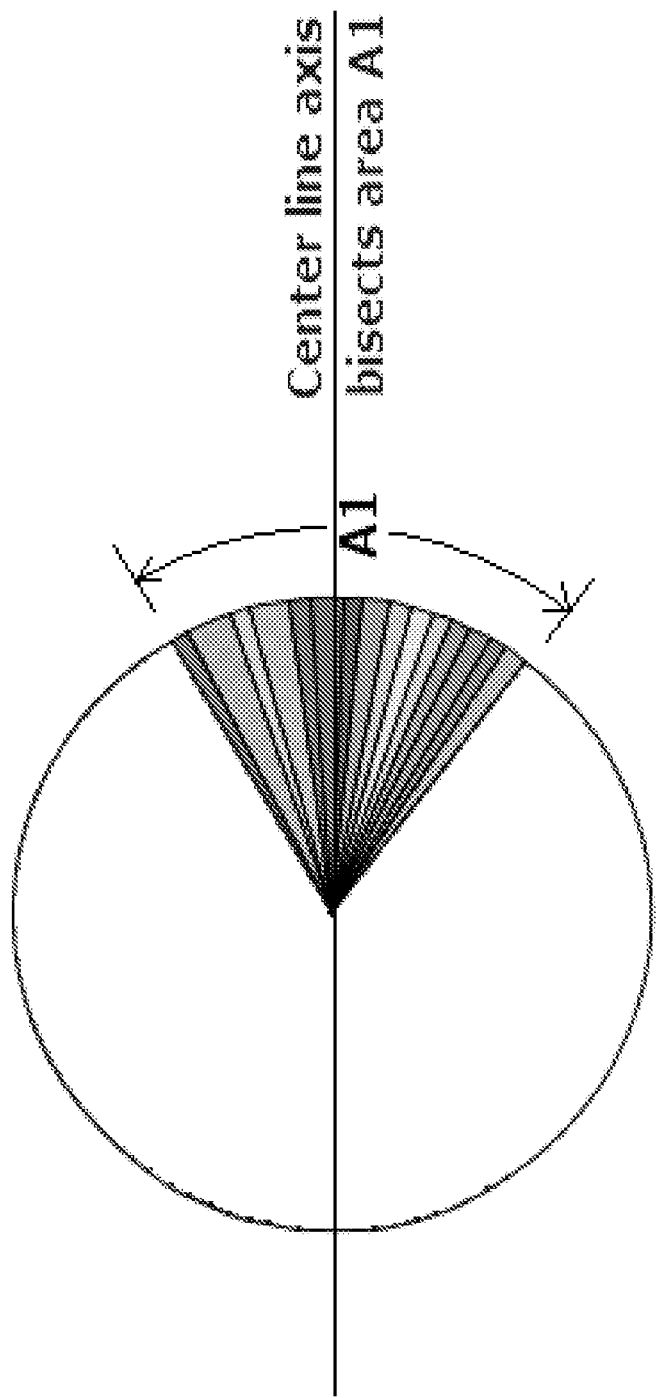
FIG. 8 is a diagram illustrating a pie chart with the placement of sub-group A1 along a horizontal center axis.

As shown in FIG. 8, the pie chart is generated and then placed at the center of the chart area for a symmetric layout. The sub-group A1 is placed in a vertical half of pie chart, such that it aligns itself along the horizontal center line axis. In other words, the center line axis of the pie chart should bisect the area of sub-group A1.

Figure 9:
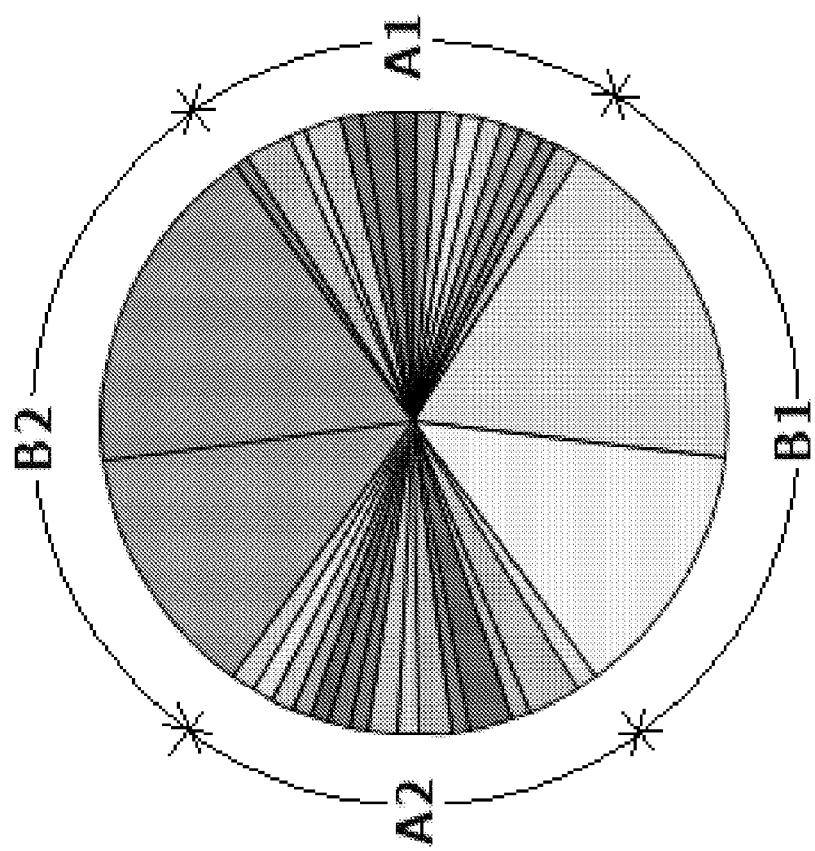
FIG. 9 is a diagram illustrating the pie chart with sub-groups A1, B1, A2, B2 arranged in order.

As shown in FIG. 9, the rest of the sub-groups B1, A2, B2 are placed counter-clockwise about the pie chart adjacent from sub-group A1, but in the order of B1, A2 and B2, wherein the "*" symbols denote the bounds of each sub-group. Alternatively, the rest of the sub-groups B1, A2, B2 may be placed clockwise about the pie chart adjacent from sub-group A1 in the order of B1, A2 and B2.

Sub-groups A1 and A2 are in two vertical halves of the pie chart. One main reason to divide these data elements in vertical halves is to take full advantage of the space available in handheld devices, such as mobile phones, tablets and the like, where one dimension of the display screen is greater than the other dimension of the display screen. Another reason is so that the labels may be placed parallel to each other in a vertical half to avoid any collision.

Label Placement

Figure 10:
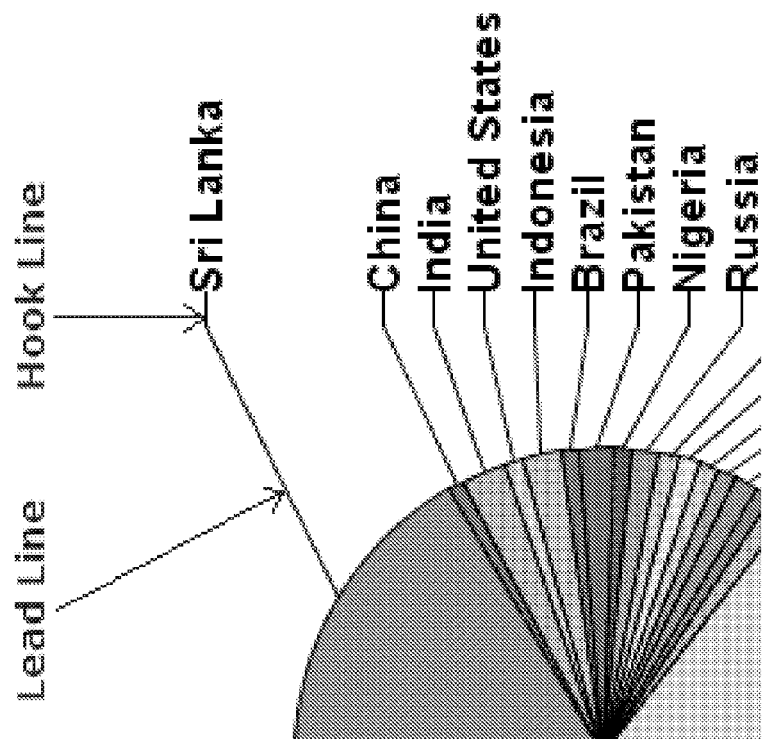
FIG. 10 is a diagram illustrating the pie chart with lead lines and hook lines.
Figure 11:
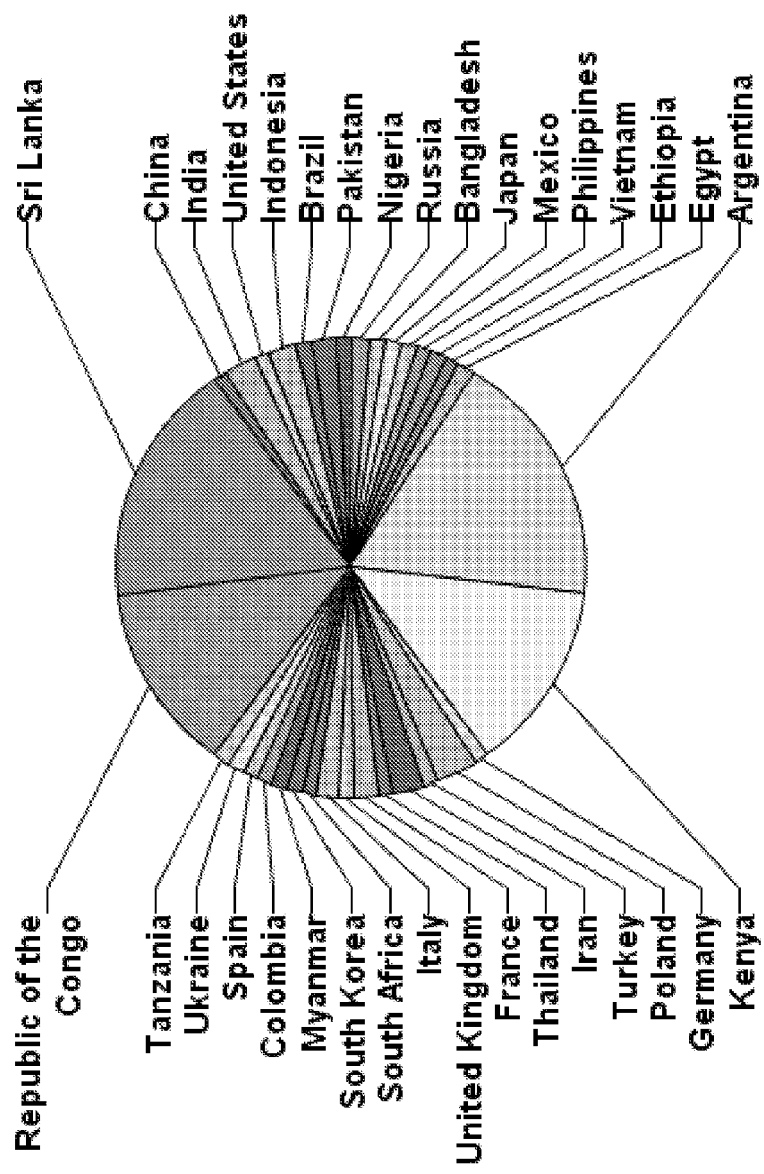
FIG. 11 is a diagram illustrating the pie chart after label placement.

There are various benefits to the arrangement of data elements utilizing the methods described herein. As shown in FIGS. 10 and 11, labels can be placed vertically on each side of the pie chart using lead lines and hook lines. If labels on the left side are right aligned and labels on the right side are left aligned, then all of the hook lines will be parallel to each other.

Furthermore, if labels collide with adjacent labels, then they can be adjusted vertically by keeping a suitable distance (which may be equivalent to the height of the label) between them, which ensures that the hook and lead lines do not intersect the adjacent hook and lead lines. In situations where labels are too long to fit, and if enough space is available, then they can be converted into multi-line text strings or otherwise clipped.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for processing a plurality of data elements for display in a pie chart, comprising:
analyzing, in one or more computers, a plurality of data elements to optimize an arrangement of slices in a pie chart, wherein a value for each of the data elements represents an area of a corresponding one of the slices in the pie chart, and the data elements are ordered by their values, so that labels and lines are placed on the pie chart without overlap;

the analyzing step comprising:

dividing the plurality of data elements, based on a threshold value, into groups A and B;

dividing the data elements in group A into sub-groups A1 and A2, in such a way that both of the sub-groups A1 and A2 contain about equal numbers of the data elements and the slices for the data elements in the sub-groups A1 and A2 cover about a same amount of area in the pie chart;

dividing the data elements in group B into sub-groups B1 and B2, in such a way that the slices for the data elements in the sub-groups B1 and B2 cover about a same amount of area in the pie chart;

arranging the data elements in each of the sub-groups A1 and A2 by pairing a remaining smallest data element with a remaining largest data element in the sub-group A1 or A2, until all, except no more than one, of the data elements is so paired;

generating the pie chart with the slices for the data elements of the sub-group A1 placed in a vertical half of the pie chart, such that a horizontal center line axis of the pie chart bisects the slices for the data elements of the sub-group A1;

placing the slices for the data elements from the sub-groups B1, A2, B2 clockwise or counter-clockwise about the pie chart adjacent the slices for the data elements from the sub-group A1; and outputting the pie chart containing the slices for the data elements of sub-groups A1, B1, A2, B2.

2. The method of claim 1, wherein the data elements in group A are below the threshold value, and the data elements in group B are at or above the threshold value.

3. The method of claim 2, wherein the threshold value is a standard deviation for the data elements.

4. The method of claim 2, wherein the threshold value is a user-defined threshold value.

\* \* \* \* \*